INVENTOR.
Gerhard Hansen

May 23, 1972

G. HANSEN 3,664,793

MANDREL FOR A DEVICE FOR THE PRODUCTION AND
FILLING OF A CONTAINER OF THERMOPLASTIC
SYNTHETIC MATERIAL

Filed Nov. 25, 1969

INVENTOR.

Gerhard Hansen

BY

Watson, Cole, Grindle & Watson
Attys.

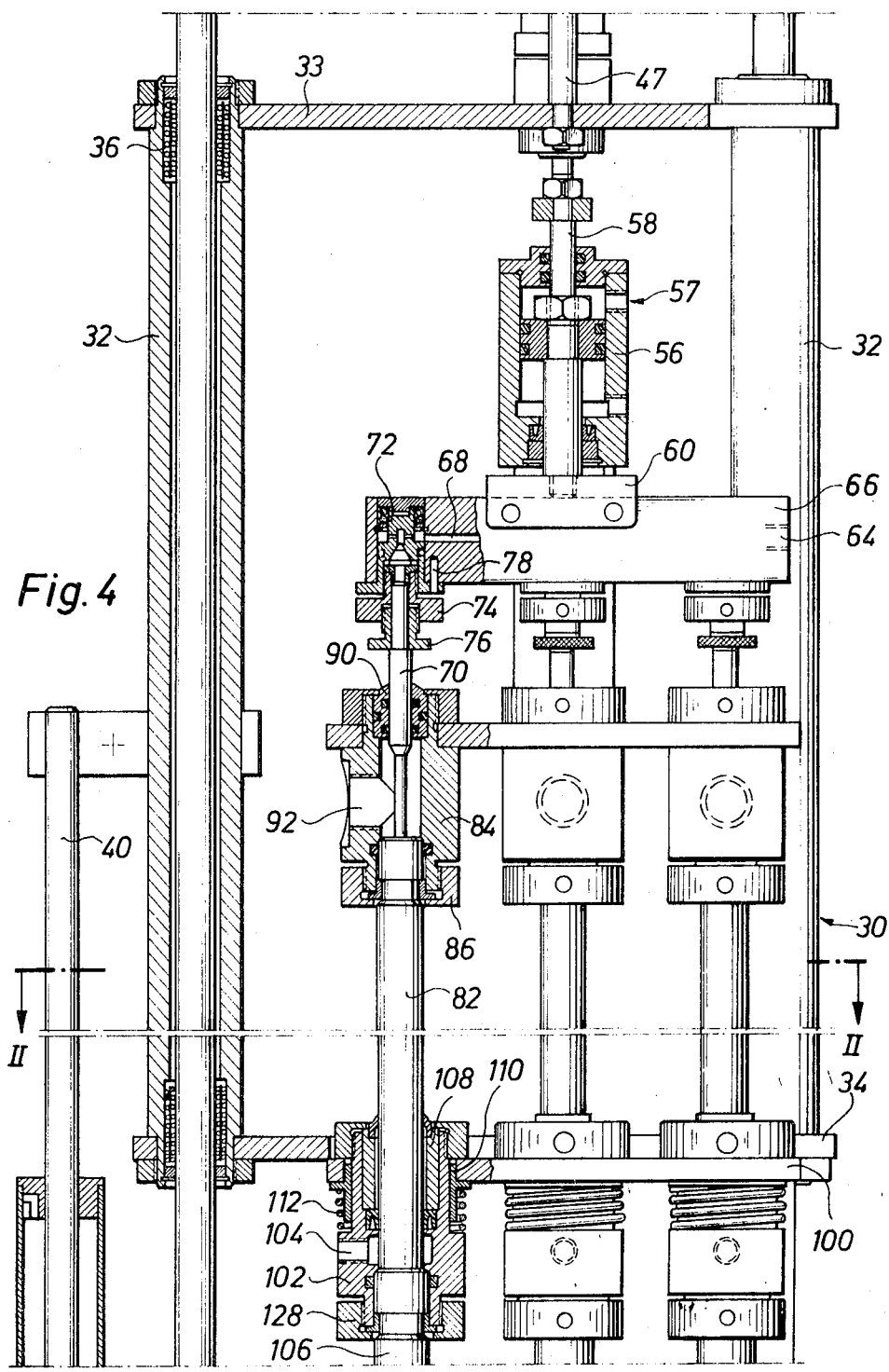

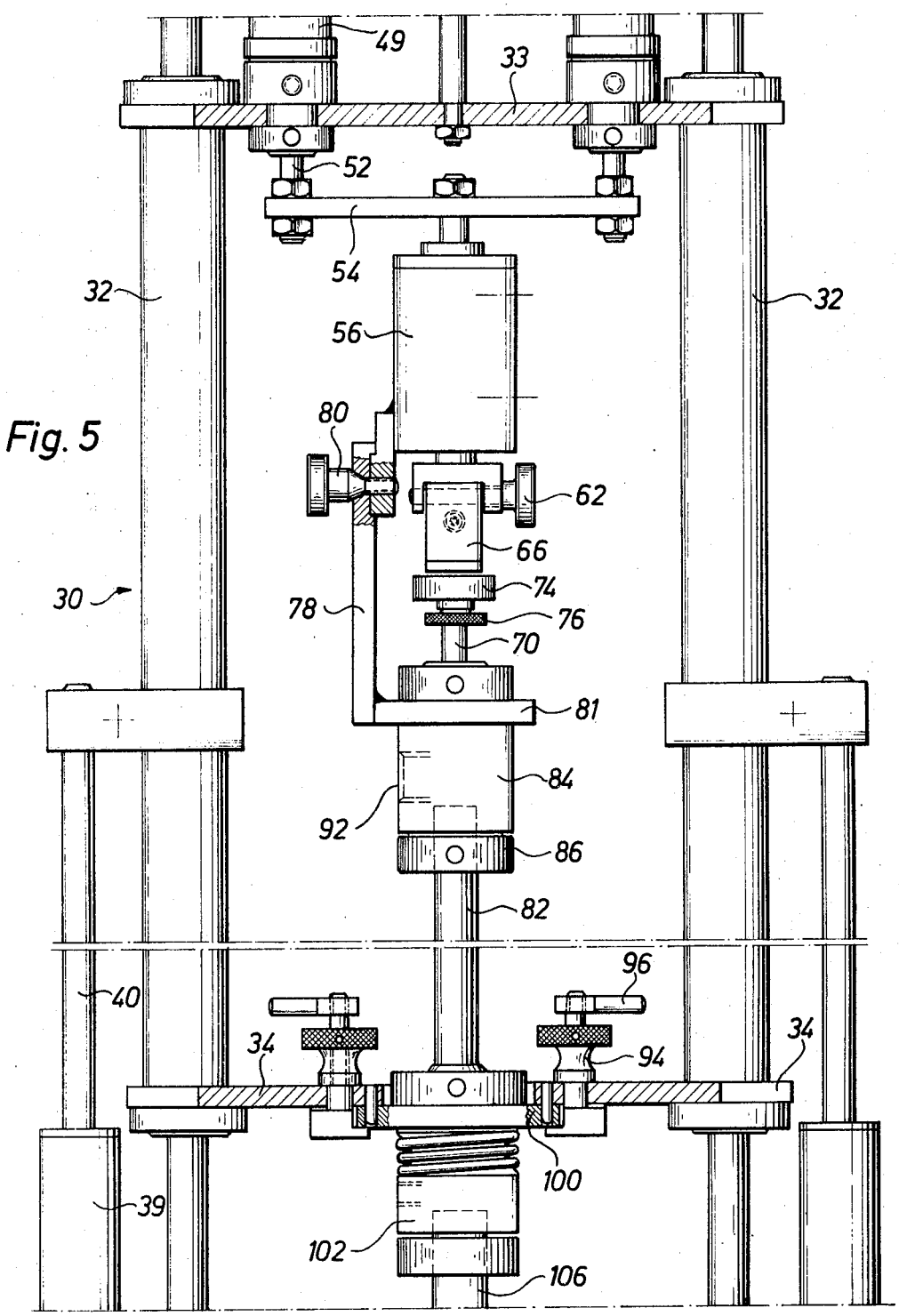

United States Patent Office 3,664,793
Patented May 23, 1972

3,664,793
MANDREL FOR A DEVICE FOR THE PRODUCTION AND FILLING OF A CONTAINER OF THERMOPLASTIC SYNTHETIC MATERIAL
Gerhard Hansen, D7013 Oeffingen, Kreis Waiblingen, Hofener Strasse 47, Oeffingen, Germany
Filed Nov. 25, 1969, Ser. No. 879,720
Claims priority, application Germany, Dec. 6, 1968,
P 18 13 047.7
Int. Cl. B29c 5/06; B65f 1/02
U.S. Cl. 425—186
19 Claims

ABSTRACT OF THE DISCLOSURE

A mandrel for a device for the shaping of a container from a tube section of thermoplastic synthetic material is provided. The mandrel has co-axial pipes forming respectively a filling channel and a gas channel, and are mutually displaceable axially and have at their lower end a valve. The two pipes may be raised and lowered by means of raising and lowering devices independently from one another. A shaft, likewise operable by means of a raising and lowering device and passing through the pipes, carries a valve member. The raising and lowering device for the outer one of the pipes engages on a displacement carriage carrying this pipe. These carriage raising and lowering devices, for the inner pipe and the shaft, are arranged in series. The length of the displacement carriage corresponds to the sum of the travel of the raising and lowering devices for the inner pipe and for the shaft. The displacement carriage is formed of two giude members and two cross-members displaceable on guide columns.

---

Figure 1:
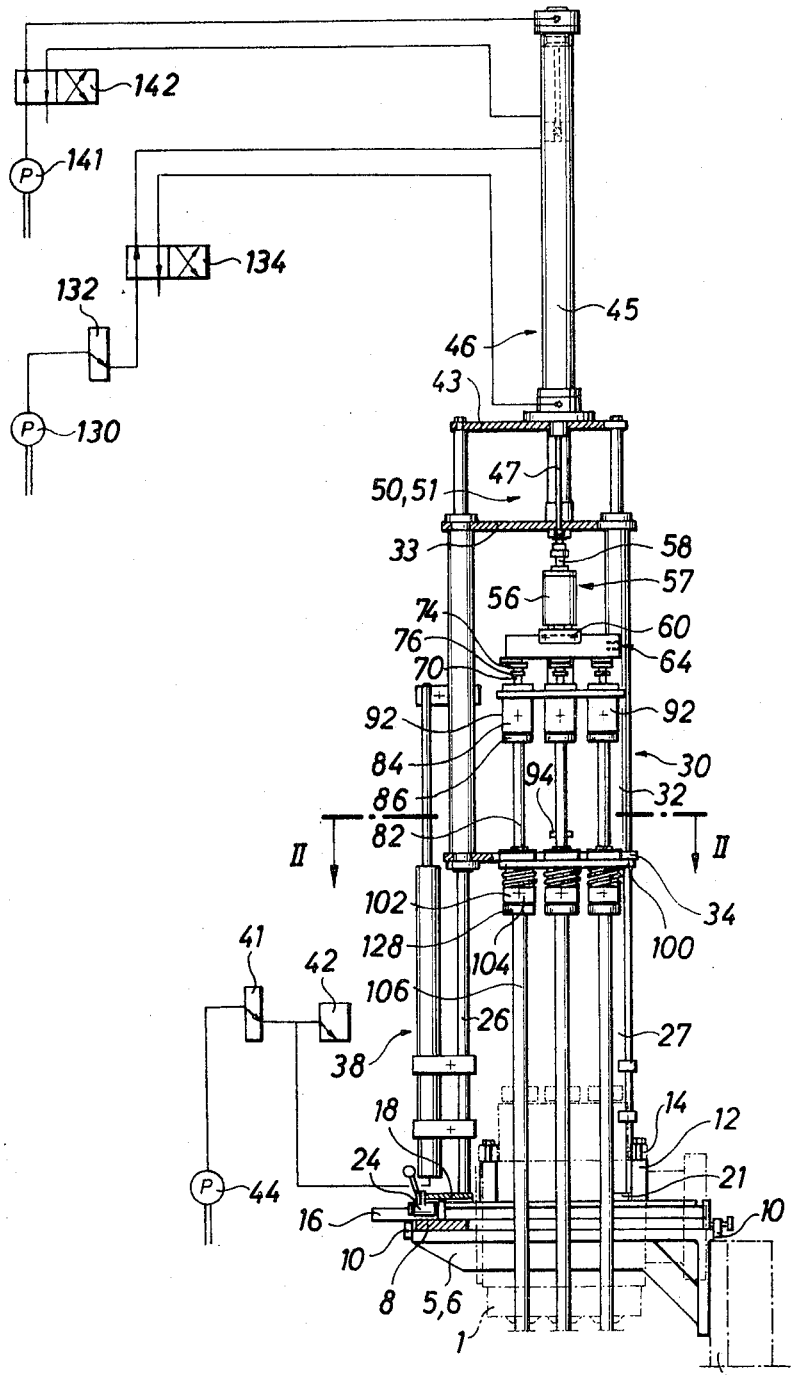

This invention relates to a mandrel for a device for the moulding and filling of a container located in a production mould and made from thermoplastic material, particularly polyethylene, polypropylene, polyvinyl chloride or the like, having two co-axial pipes forming, respectively, a filling channel and a gas channel which are displaceable axially in relation to one another and whose outlet ends form a valve closing the annular channel thereof. A valve member is arranged in the channel of the inner pipe and effective leading or lagging the annular channel valve, mounted on a shaft passing through both pipes and which is axially also displaceable at least in relation to the outer pipe, a feed pipe for the feed of the filler material being attached to the channel in the inner pipe. A known mandrel has a raising and lowering device for the outer pipe and the shaft respectively, the inner pipe being driven from the shaft by means of a driver. A valve disposed between the shaft and the inner pipe serves to hold a spring acting on the driver open. In this mandrel the commencent of the opening and closing of the valve built by the inner pipe and the shaft is dependent on the distance travelled by the shaft.

The object of the present invention is to provide a mandrel whose valves are adapted to be opened and closed as desired and wherein the ends of those parts of the mandrel remote from the valves are not only easily accessible and may be easily inspected but are such that conduits may be readily attached thereto and obstructions may be readily removed. This object is achieved according to the invention in that the two pipes and the shaft each have an independent raising and lowering device, in that the raising and lowering device for the outer pipe engages on a displacement carriage carrying this pipe which carries raising and lowering devices arranged in series for the inner pipe and shaft, respectively, and whose length corresponds to the sum of the lengths of the raising and lowering devices of the inner pipe and of the shaft.

In this way it is possible to arrange the inner pipe projecting above the outer pipe and the shaft above the inner pipe so that the upper ends of the pipes and of the shaft are easily accessible, and any operational blockages easily removed. Due to the coordination of raising and lowering devices with each pipe and with the shaft a mutually independent displacement of the parts is obtained. The arrangement for a carriage allows a space-saving mounting of the raising and lowering devices as well as of the parts attached thereto. Furthermore, several individual mandrels may be arranged adjacent one another and operated with the same raising and lowering devices.

In accordance with the invention the displacement carriage is made of guide members and two cross members displaceable on guide columns. The upper cross member, arranged on each side, carries the raising and lowering device for the outer pipe and the raising and lowering device for the inner pipe, while parts movable against the displaceable carriage are connected together by means of a cross member. Also, the outer pipe is secured to the lower cross member.

If the raising and lowering device for the displaceable carriage, whose piston, at least in the direction of lowering, is attachable to a pressure reduction valve, then the resting force of the mandrel on the soft deformable plastic tube, serving for the production of the container, adapts itself to the bearing capability of said tube so that a pressing through of the deformable hot plastic tube may be prevented positively.

The raising and lowering devices for the outer pipe and the inner pipe are advantageously designed as working cylinders having reciprocating cylinders each with a stop piston. In this way the pipes can take up an intermediate position between two end positions. Therefore, the outer pipe can travel, during operation, between two operational positions and, when inoperable, into a position of rest. Also, regarding the inner pipe, premature closure of the valve, formed between the outer and the inner pipe for the drainage of air, can be prevented.

Similar work cylinder parts and similar piston rod parts are firmly connected together, in at least two raising and lowering devices and more particularly, for the inner pipe and shaft. The other parts are mutually movable in relation to the parts firmly connected together. Only one raising and lowering device serves for the actual lowering and raising of the inner pipe and shaft. This produces easier adjustment of the mandrel as compared to a pair of raising and lowering devices arranged in series.

In one embodiment of the invention an extension piece is arranged at the upper end of the outer pipe which is displaceably and resiliently supported against the displaceable carriage and which tightly surrounds the inner pipe at its end remote from the outer pipe. The resilient support serves for the compensation of tolerances in length between various outer pipes which can be inserted behind one another and between adjacently mounted outer pipes in a multiple mandrel. The raising and lowering devices for the inner pipe and the shaft are so designed that the valves formed between the pipe and the shaft close tightly each time the mandrel is in the upper position.

The device is further characterised in that the weight of the displaceable parts is at least substantially compensated for by means of a compensating device engaging the displacement carriage. Accordingly, relief of the raising and lowering device for the outer pipe can be obtained and can therefore be maintained relatively small. The applied pressure of the mandrel on the tube forming the container and the recoil of the compensation device can easily be adapted to individual circumstances by an adjustable pressure medium. The invention further provides that the outer pipe, the inner pipe and the shaft are in each case releasably connected to the raising and lowering devices associated with them. Due to the releasable connection, the pipes and the shaft can be made readily accessible for cleaning and in the event of stoppages, and thus an operational disturbance can be rapidly overcome.

An advantage in the releasable connection design resides in the fact that a holding plate is mounted on the outer pipe by means of which it is releasably connected to the side of the displacement carriage remote from the raising and lowering device by means of a clamp. Moreover, the inner pipe has a holding piece at its upper end with which it is releasably connected, by means of a releasable connecting member, to the jacket of the cylinder of the work cylinder of the raising and lowering device. Also, shaft is releasably connected to the piston rod by means of a releasable connecting member.

Easy release of the mandrel as a whole is further obtained in that the displacement track of the displacement carriage is releasably connected to a device for the production and filling of the container.

According to the invention, particularly in the arrangement of more than one mandrel, three displacement tracks for the displacement carriage may be provided and arranged as a triangle. This produces a stable design of the mandrel.

The invention also proposes that a source of pressure medium designed as a tangential fan is attachable to an extruder head through which the mandrel passes and enters into the extruded tube portion which serves for the maintenance of a substantially constant pressure within the extruded tube portion. By use of a tangential fan, the shape of the tube pressed out by the extruder and downwardly closed, on raising and lowering of the mandrel is not greatly altered nor is too highly inflated nor rests against the mandrel located in the piece of tube to remain stuck thereon. The pressure is at the same time so selected that slight inflation of the plastic tube takes place and is maintained in spite of varying amounts of air.

Only a tangential fan provides a pressure remaining within narrow limits in amounts varying within wide limits; for example, a slight excess pressure of about 100 mm. columns of water.

Figure 2:
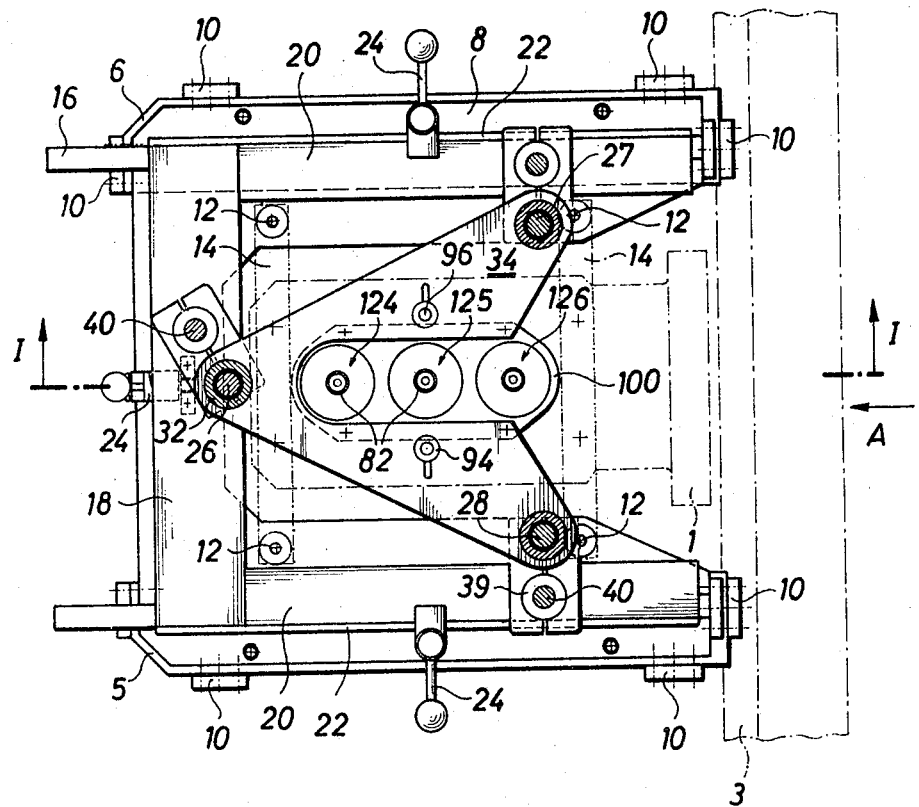
Figure 3:
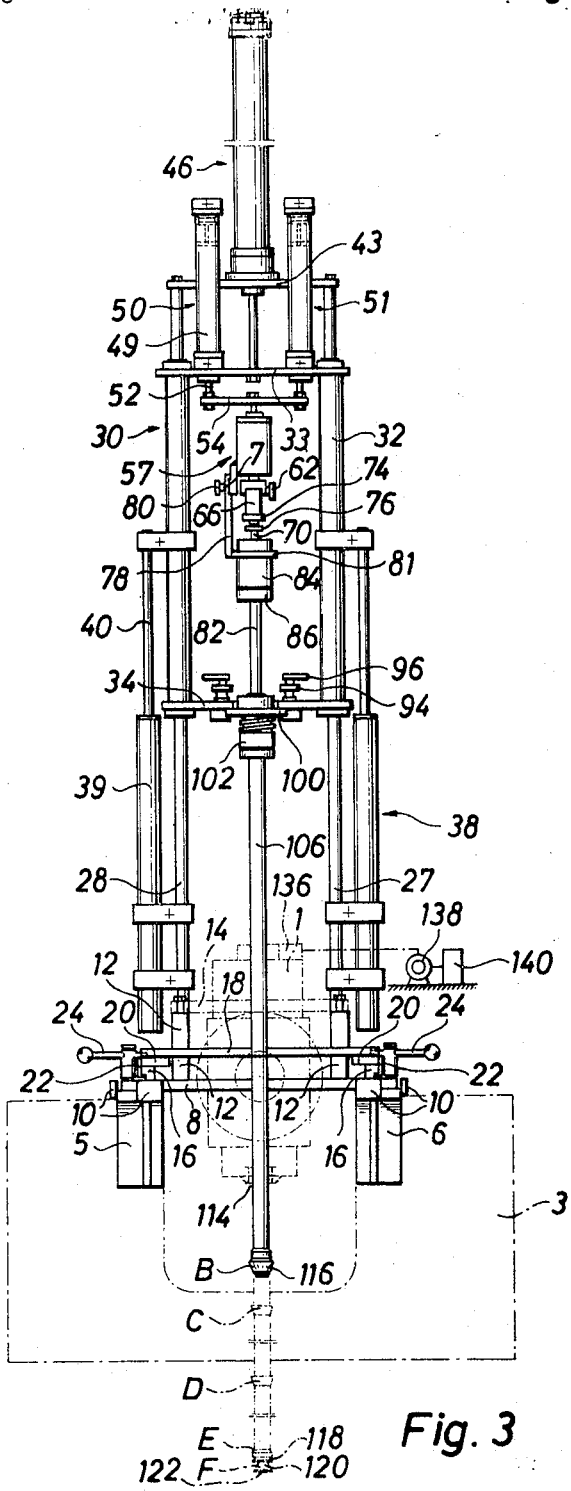

Further advantages and features of the invention will become apparent from the following description with reference to the drawings, wherein a mandrel is schematically represented, by way of example only, of the subject matter and in which FIG. 1 is a section taken along line I—I in FIG. 2; FIG. 2 is a section along line II—II in FIG. 1 with some parts in different positions; FIG. 3 is a view in the direction of the arrow A in FIG. 2 with certain parts omitted; and FIGS. 4 and 5 are, respectively, part sectional views of parts of FIGS. 1 and 3 on a larger scale.

The mandrel is a component part of a device for the forming and filling of a container made from thermoplastic material particularly polyethylene, polypropylene, polyvinyl chloride of the like. Such a device has half-moulds (not shown) arranged on two guide tracks which are passed below the mandrel to receive a tube of plastic material pressed out of an extruder head, closed into a production mould and removed from the mandrel in the axial direction thereof. The tube of plastic material received by a production mould is shaped into a container by means of the mandrel under the action of inner and/or outer pressure, is filled by the latter and is finally closed in the mould and subsequently removed from the mould by the separation of the halves thereof.

This device has a vertical holding plate 3 to which a pair of brackets 5 and 6 are secured. A carrier plate 8 rests on the brackets and is held in position by means of stop members 10 arranged on the brackets 5 and 6. Holding bolts 12 threadedly secured onto carrier plate 8, carry on their upper side cross-bars 14 for securing an extruder head 1. Rails 16 are provided, each having a cut-out on their lower outer side, and a longitudinal member 20 rests on each of these rails. The two longitudinal members 20 are connected together by a cross member 18 to form a displacement member. Holding rails 22 are arranged along the outer sides of longitudinal members 20, and are clamped below the slide rails 16 to prevent upward lifting of the displacement plate 18, 20. On the side of the carrier plate 8 remote from the arrow A of FIG. 2, holding devices 24 are provided for the adjustment of the displacement plate 18, 20. Each of these holding devices has a handle part and a holding part arranged on a holding member. The holding member is pivotally mounted on a holding bolt with the interposition of a spring.

Three guide columns 26, 27, 28 are secured on the plate 18, 20, the column 26 being mounted on the cross bar 18 and the columns 27 and 28 on the longitudinal members 20 with, in each case a link member 21 being employed. The guide columns 26 to 28 serve for the displaceable bearing of a displacement carriage 30 consisting of three tubular guide members 32, an upper cross member 33 and a lower cross member 34. Linear ball bushings 36 are provided at the ends of guide member 32.

A work cylinder or compensating device 38 is arranged parallel to each guide column and is secured thereto by means of its jacket 39. A piston rod 40 thereof, adapted to slide in the cylinder jacket 39 is, connected to the associated guide member 32.

The cylinder jacket 39 is connected at its lower end to a fluid pressure source 44 by means of an adjustable pressure reduction valve 14 having an adjustable excess pressure outlet or pressure restricting valve 42. The other end of jacket 39 communicates with the open air. The compensation device formed by the work cylinder 38 cancels out substantially the whole weight of the mass to be moved.

The guide columns 26 to 28 are connected at their upper ends to a head plate 43 which carries a cylinder jacket 45 of a work cylinder 46 whose piston rod 47 is connected to the upper cross member 33 of the displacement carriage 30. Cylinder jackets 49 of two work cylinders 50 and 51 are secured on the cross member 33 along opposite sides of piston rod 47, the piston rods 52 thereof being connected together by a cross member 54.

Each of the work cylinders 46, 50 and 51 is double-acting and has in its upper part, in a separated chamber, a stop piston shown in chain dotted line and displaceable per se, which in each case serves as the stop for the piston connected to the piston rod passing outwardly and is displaceable between two end positions (FIG. 3). If the pressure source, particularly compressed air, is connected to the upper side of the stop piston, such will be located in its lower position to limit the displacement track of the work piston. If, however, the upper side of the stop piston is connected to the circumambient air or to a stock container, then the pressure acting on the piston rod side of the work piston displaces this into its upper end position.

A source 130 of fluid pressure medium, particularly compressed air, serves to supply the side of the work cylinder 46 receiving the work piston and can be connected, via an adjustable pressure reduction valve 132 and a control valve 134, to two lower attachments of the work cylinder 46. The upper part of the work cylinder 46 receiving the stop piston is connected by means of two upper conduits via a control valve 135 to a source of fluid pressure, particularly compressed air.

A corresponding supply (not shown) of pressure medium is provided for the work cylinders 50, 51.

The cross member 54 is connected to a piston rod 58 passing through the cylinder jacket 56 of a work cylinder 57, which is threadedly secured into a stirrup 60. An inflation member 66 (see FIG. 4) provided with an attachmen for compressed air to inflate the plastic tube thereby producing of the container is connected by means of two positioning screws 62 to the stirrup 60. Member 66 has a longitudinal bore 68 and three cross bores each of which serve for the attachment of a hollow shaft 70. Member 66 is engaged by an attachment member 72 inserted in each cross bore. Each member 72 has an annular channel connected with longitudinal bore 68, and a downwardly diverging longitudinal bore for the reception of each shaft 70. Attachment member 72 is held in each bore of inflation member 66 by means of a spring ring and resilient washers over which a cover plate is threadedly secured. In this way, inflation member 66 is resiliently mounted in an axial direction by reason of said resiliently mounted shafts thereby providing some compensation for any length and/or attachment factors upwardly of the member 72. Two semi-circular holding members of angular cross-section are located along a reduced upper diameter section of the shaft 70 and are held in place by means of a hollow screw 74 threadly secured into attachment member 72. A positioning screw 76 threadly engages screw 74 and supports itself on the collar of the shaft 70 defined by the reduced diameter section. The attachment member 72 is held against rotation by means of a peg 78. A cross member 81 is releasbly connected to the cylinder jacket 56 (see FIG. 5) by means of a holding member 78 and a positioning screw 80. Attachment pieces 84 are secured to the cross-member 81. Each attachment piece serves to attach an inner pipe by means of semi-circular securing pieces disposed along an annular groove which are held in place by an attachment piece 84 and a nut 86. The attachment piece 84 is penetrated only at its upper side by shaft 70 which is sealed therein by means of a seal 90 consisting of two inner seals and three outer seals provided between each shaft 70 and each attachment member. The attachment piece 84 has an inlet 92 for the feed of filling material which is fed in the channel of the filling material formed between the shaft 70 and the inner pipe 82.

A holding plate 100 (see FIG. 4) is secured to lower cross bar 34 of displacement carriage 30 by means of toggle screws 96, each adjustable by a nut 94. Three attachment pieces 102 are mounted to holding plate 100, each piece having an air outlet 104. Each attachment piece is secured to an outer pipe 106 in a manner similar to the piece 84 being secured to the inner pipe 82. The upper part of attachment piece 102 is penetrated only by the inner pipe 82 and the shaft 70 located therein, the pipe 82 sliding within the outer pipe 106 and forming therewith an air drain channel. The inner pipe 82 is surrounded by a sealing member 108 in the area of the attachment piece 102.

A slide bush 110, disposed about an axially reduced upper portion of each attachment 102 is provided on its outer side with a flange which fits under the holding plate 101. A spring 112 is dropped between the flange and the collar of attachment piece 102 thereby urging them farther apart.

The pipes 82 and 106, disposed within one another, and the hollow shaft 70, located in the inner pipe 82, pass through extruder head 1. At the underside thereof an annular outlet 114 which surrounds outer pipe 106 is provided for a tube of plastic material. The outer pipe 106 is provided with a support cone 116 at its lower end which serves to rest on the plastic tube. The outer pipe is shown in FIG. 3 in full lines in its initial position B and in chain-dotted lines in its upper and lower operational positions C and D. The lower end of inner pipe 82 is shown in its lower operational position E and the lower end of the shaft 70 in its lower operational position F. The outer pipe 106 and the inner pipe 82 form a valve for the waste air channel which is closed in the initial position C for and, for this purpose, the inner pipe 82 carries a sealing washer 118 at its lower end. The lower end of the shaft 70 has a sealing cone 120 which forms a valve for the filling material with the inner side of the inner pipe. The channel penetrating the shaft 70 over its entire length is closed off at its lower end by a downwardly opening non-return valve 122.

The above description of the left hand individual mandrel 124 shown in FIG. 1 applies equally well for the mandrels 125, 126 arranged parallel thereto and which are constructed and attached in a like manner.

An orifice for the feed and, if desired, for the drainage of air, is limited by the outer pipe and is located on the under side of the extruder head 1 within the outlet for the plastic tube. This orifice is connected via heater 136 (FIG. 3) of slight flow-through resistance to a tangential fan 138 which serves for the maintenance of a substantially constant pressure of about 100 mm. water column within the tube extruded from the extruder. The support air passed through the heater is sterilised therein. The speed of the tangential fan may be controlled as desired by a control device 140.

Before the mandrel comes into operation the individual mandrels 124 to 126 take up the initial position B shown in full lines in FIG. 3. During operation, the support cone 116 is rapidly moved by activation of work cylinder 46 to position C onto the tube extruded from the extruder head 1. The mould (not shown) is closed and, thereafter, a gradual movement occurs until the position D is reached. As the suppport cone 116 is placed on the tube section located in the mould, compressed air is fed via the inner channel of the shaft 70 to inflate the tube section against the wall of the mould for the formation of a container, the inflation taking place during about one quarter of the distance to be travelled between the positions C and D.

Inflation of the container may be assisted by a suction acting on the outside or may be carried out independently. The filling process then commences and, the inner pipe, being so moved out in such a manner, quickly reaches the bottom of the container and follows this at a short distance during its further movement in the constantly travelling mould, the valve being opened from the commencement of the filling to completion thereof by means of work cylinder 56 by an amount represented by the positions E and F of the lower side of the inner pipe 82 and of the shaft 70. The work cylinder 56 may be arranged parallel with a work cylinder for operation of a closing device (not shown). Due to the movement of inner pipe 82 outwardly of outer pipe 106, the valve draining the air is opened so that waste air may be drained away through the channel formed between inner pipe 82 and outer pipe 106 and via attachment position 104. A receptacle for any filling material carried thereby is preferably attached thereto. A negative pressure may be attached to the receptacle to prevent both the settling of foam in the piping attached therein and a possible return flow of unsterile air into the container. The suction used here is considerably less than the suction in the mould serving to inflate the container. The end 118 of the inner pipe 82 need only follow the bottom of the container to the extent that the filling material in the container rises so as to prevent the formation of foam, the valve for the filling material lying somewhat below the level of the material. When the container is full, the outer pipe 106, the inner pipe 82 and the shaft 70 return rapidly to the initial position shown in full lines, whereupon a further cycle commences as described above.

During operation of the device the stop piston in the work cylinder 46 remains in its extended position. The mandrel is in each case returned to its initial position B because the stop piston in the work cylinder 46 is constantly affected by fluid pressure on its upper side. The stop pistons in the work cylinders 40 and 50 prevent the valve draining the air which would close too early. The relationships are so selected that, as long as a closing device (not shown) pushes out the filling material in a predetermined amount, pressure remains on the stop pistons of the work cylinders 50, 51 and the pistons are without pressure only after completion of the pushing out process of the closing device, so that the work cylinders 50, 51 can travel in completely. Only thereafter does the new process commence.

The work cylinders 38 serve for the compensation of the weight of the parts displaceable with the displacement carriage 30. The loading of the work piston in the work cylinder 46 can be adapted to the force of the application of support cone 116 on the plastic tube by means of pressure reduction valve 41.

If desired a high pressure may be used on the end of the work piston of work cylinder 38 remote from the piston rod, which serves to support the work cylinder 46 on return of the movable parts in order to minimize lost time. The spring 112 serves for the compensation of various lengths of outer pipes 106 arranged adjacent one another and for the compensation of length tolerances in adjacent outer pipes where the outer ones are colder and therefore longer than the central outer pipe.

The movement of the inner pipe in the container to be filled is so arranged that as little filling material as possible is extruded by the inner pipe and the shaft if complete filling of the container is to be achieved, which is made by the adjustment of the point of return of the inner pipe.

In order to make the outer pipe 106, the inner pipe 82 and the shaft 70 accessible at their respective upper ends, toggle screws 96 are loosened and positioning screws 62, 80 are removed. After loosening of holding device 24 the displacement plates 18, 20 in FIG. 1 may be pushed to the left, whereby the guide columns 26 to 28, the guide carriage 30, and the work cylinders 38, 46, 50, 51 and 56 can be removed from the individual mandrels along with the parts associated with them. For example, the shaft 70 and the inner pipe 82 may be upwardly withdrawn. When the inner pipe 82 and the shaft 70 are reinserted, the mandrel can be made ready again for operation by pushing back the plates 18, 20 and the parts connected thereto and by connecting the parts previously loosened.

The movements of the work cylinder described above may be controlled automatically by means of a control device (not shown) so that the production, filling and closing of a container takes place fully automatically.

The tangential fan 138 holds the pressure of the supporting air blown into the tube section at a constant pressure of about 50 to 100 mm. water column. By this means any danger of the tube being too highly inflated, due to the changing volume in tube, or the tube resting on the mandrel located therein on raising or lowering of the mandrel, is avoided. By maintenance of a slight, constant, excessive pressure, a slight inflation of the plastic tube takes place which, during operation, must be maintained by feeding in a sufficient amount of air. A tangential fan pushes a large amount of air while retaining the static pressure. The adjustment of the speed and thus the effectiveness of the tangential fan takes place in correspondence with each material being worked on respecting, the thickness of the tube section and its temperature on passing out of the extruder head. The heater 136 of slight resistance to flow-through serves for the sterilisation of the support air fed into the plastic tube. The arrangement of a filter is not possible due to excessive resistance to flow through.

What I claim is:

1. A mandrel for a device for the extruding and shaping of a container from a tube section of thermoplastic material such as polyethylene, polypropylene, polyvinyl chloride or the like, and comprising means for extruding a tube section of thermoplastic material and a production mold, and two co-axial pipes forming an annular filling channel and an exhaust air channel, said pipes being axially displaceable in relation to one another and said pipes each having outlet ends, first valve means at said outlet ends for closing the exhaust air channel, a hollow shaft extending axially through said pipes, second valve means secured to said shaft at its outer end for closing the filling channel, said second valve means being disposed adjacent said first valve means when the filling channel is closed, said shaft being axially displaceable at least in relation to the outer one of said pipes, means for feeding filling material to the inner one of said pipes, said two pipes and said shaft each having independent raising and lowering means, said inner pipe and said shaft raising and lowering means being slidable along guide means, a sliding carriage supporting said outer pipe, said inner pipe and said shaft being secured to said sliding carriage, said raising and lowering means for said inner pipe and said shaft being connected in series, and the length of said sliding carriage corresponding to the sum of the travel of said raising and lowering means of said inner pipe and of said shaft.

2. A mandrel according to claim 1 wherein said sliding carriage comprises guide columns and guide members displaceable thereon, upper and lower cross members wherein said upper cross member carries said inner pipe raising and lowering means, and wherein said outer pipe is secured to said lower cross member.

3. A mandrel according to claim 2, wherein said raising and lowering means for said sliding carriage is a work cylinder, a fluid pressure source being connected to said cylinder through a pressure reduction valve for causing the piston rod of said cylinder to be moved at least outwardly thereof.

4. A mandrel according to claim 3 wherein said displacement carriage is mounted on linear bushings.

5. A mandrel according to claim 2 wherein said raising and lowering means for said outer pipe, and said inner pipe are each designed as a double-acting work cylinder each having a stop piston.

6. A mandrel according to claim 5 wherein at least two of said raising and lowering means are secured together.

7. A mandrel according to claim 6 wherein an attachment piece is mounted to the upper end of said outer pipe, said piece being displaceable against said displacement carriage, being resiliently supported, and surrounding in a sealing manner said inner pipe at its end remote from said outer pipe upper end.

8. A mandrel according to claim 7, wherein said attachment piece is displaceably mounted in a slide bush disposed about a constricted portion of said attachment piece, said bush having an outwardly extending flange, and a coil spring being disposed between said flange and said attachment piece urging them apart.

9. A mandrel according to claim 8 wherein a compensating device is mounted on said sliding carriage.

10. A mandrel according to claim 9, wherein said compensating device has at least one work cylinder which is connected via a pressure reduction valve and a pressure restricting valve to a pressure source.

11. A mandrel according to claim 10 wherein said outer pipe, said inner pipe and said shaft are respectively releasably connected to their associated raising and lowering means.

12. A mandrel according to claim 11, wherein a holding plate is mounted to said outer pipe, said plate being releasably connected to said lower cross member by means of a clamp device, said inner pipe has a holding member provided on its upper end, said holding member being releasably connected to said shaft work cylinder by means of a releasable securing member and wherein said shaft is releasably connected to said work cylinder piston rod by means of a releasable link member.

13. A mandrel according to claim 12, wherein said guide columns for said displacement carriage are releasably mounted for the shaping of the container.

14. A mandrel according to claim 13, wherein each said guide columns have a displacement member which is adapted to be displaced on a support member and is secured releasably thereagainst.

15. A mandrel according to claim 14 wherein three of said guide columns are provided.

16. A mandrel according to claim 15 wherein a pressure source comprising a tangential fan is provided for maintaining a constant pressure within the piece of tube to be shaped.

17. A mandrel according to claim 16, wherein a control device is provided for said tangential fan for controlling the speed thereof.

18. A mandrel according to claim 17, wherein a heater of slight air resistance is arranged downstream of said tangential fan for the sterilisation of the air passed into said tube section.

19. A mandrel according to claim 18 wherein said displacement carriage carries said raising and lowering means for said inner pipe, and wherein said shaft raising and lowering device is disposed between said inner pipe and its raising and lowering means.

References Cited

UNITED STATES PATENTS

| 2,962,843 | 12/1960 | Hoelzer et al. | 53—180 X |
| 3,523,329 | 8/1970 | Gallay | 53—140 X |
| 3,523,330 | 8/1970 | Gallay | 18—5 |

FOREIGN PATENTS

| 869,759 | 7/1961 | Great Britain. |

THERON E. CONDON, Primary Examiner

E. F. DESMOND, Assistant Examiner

U.S. Cl. X.R.

53—140; 425—317, 326, 163